(12) United States Patent
Parameswaran et al.

(10) Patent No.: US 10,284,392 B2
(45) Date of Patent: May 7, 2019

(54) VIRTUAL PRIVATE NETWORK RESILIENCY OVER MULTIPLE TRANSPORTS

(71) Applicant: AT&T Intellectual Property I, L.P., Atlanta, GA (US)

(72) Inventors: Lalitha Parameswaran, Santa Cruz, CA (US); Zhen Qi Dong, Pleasanton, CA (US); Michael Satterlee, Clifton Park, NY (US); John Medamana, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 22 days.

(21) Appl. No.: 15/599,989

(22) Filed: May 19, 2017

(65) Prior Publication Data

US 2018/0337802 A1    Nov. 22, 2018

(51) Int. Cl.
*H04L 12/28* (2006.01)
*H04L 12/46* (2006.01)
(Continued)

(52) U.S. Cl.
CPC ...... *H04L 12/4641* (2013.01); *H04L 12/4633* (2013.01); *H04L 61/256* (2013.01);
(Continued)

(58) Field of Classification Search
CPC .............. H04L 12/4641; H04L 61/256; H04L 63/0272; H04L 12/4633; H04W 76/22; H04W 80/06
See application file for complete search history.

(56) References Cited

U.S. PATENT DOCUMENTS 6,173,399 B1    1/2001    Gilbrech
6,493,349 B1    12/2002    Casey
(Continued)

FOREIGN PATENT DOCUMENTS

CN    102447584    5/2012
KR    100625764    9/2006
(Continued)

OTHER PUBLICATIONS

Holmström et al., "DSiP Distributed Systems intercommunication Protocol—A Traffic Engineering Solution for Secure Multichannel Communication," Proceedings of the 9th WSEAS International Conference on Applied Electromagnetics, Wireless and Optical Communications (Electroscience '11), Mar. 24-26, 2011, pp. 57-60.
(Continued)

*Primary Examiner* — Clemence S Han
(74) *Attorney, Agent, or Firm* — Hartman & Citrin LLC (57) ABSTRACT

Concepts and technologies disclosed herein are directed to virtual private network ("VPN") resiliency over multiple transports. According to one aspect, a customer premises equipment can select, from a transport preference database, a transport from a plurality of transports available to support a VPN tunnel. The transport selected is associated with a highest priority value of the plurality of transports in the transport preference database. The customer premises equipment can initiate setup of the VPN tunnel through the transport and can determine whether setup of the VPN tunnel was successful. If setup was not successful, the customer premises equipment can select a further transport from the plurality of transports available to support the VPN tunnel. Additional details are disclosed herein.

15 Claims, 8 Drawing Sheets

(51) Int. Cl.
*H04L 29/06* (2006.01)
*H04W 80/06* (2009.01)
*H04L 29/12* (2006.01)
*H04W 76/22* (2018.01)

(52) U.S. Cl.
CPC ......... *H04L 63/0272* (2013.01); *H04W 76/22* (2018.02); *H04W 80/06* (2013.01)

(56) References Cited

U.S. PATENT DOCUMENTS

| | | |
|---|---|---|
| 6,856,676 B1 | 2/2005 | Pirot et al. |
| 7,139,276 B1 * | 11/2006 | Sitaraman ........... H04L 12/4633 370/401 |
| 7,580,417 B2 | 8/2009 | Ervin et al. |
| 7,583,665 B1 | 9/2009 | Duncan et al. |
| 7,606,260 B2 | 10/2009 | Oguchi et al. |
| 7,647,422 B2 | 1/2010 | Singh et al. |
| 7,864,762 B2 | 1/2011 | Carrasco |
| 7,882,247 B2 | 2/2011 | Sturniolo et al. |
| 8,089,958 B2 | 1/2012 | Elliott et al. |
| 8,107,363 B1 | 1/2012 | Saluja |
| 8,284,943 B2 | 10/2012 | Carrasco |
| 8,352,535 B2 | 1/2013 | Peled et al. |
| 8,693,347 B2 | 4/2014 | Elliott et al. |
| 8,737,200 B1 | 5/2014 | Ould-Brahim |
| 8,811,409 B2 | 8/2014 | Allan |
| 8,819,486 B2 | 8/2014 | Aaronson et al. |
| 8,891,406 B1 * | 11/2014 | Shekhar ................ H04L 45/00 370/255 |
| 9,036,467 B1 | 5/2015 | Saluja |
| 9,277,000 B2 | 3/2016 | Duggal |
| 9,319,300 B2 | 4/2016 | Huynh Van et al. |
| 9,559,903 B2 | 1/2017 | Edwards |
| 2011/0263246 A1 * | 10/2011 | Ruan ................... H04L 12/5691 455/426.1 |
| 2013/0235728 A1 * | 9/2013 | Le ......................... H04W 40/02 370/236 |
| 2016/0043969 A1 * | 2/2016 | Sung ..................... H04L 47/825 370/392 |
| 2016/0285977 A1 * | 9/2016 | Ng ....................... H04L 12/4625 |

FOREIGN PATENT DOCUMENTS

| | | |
|---|---|---|
| KR | 100664715 | 1/2007 |
| WO | WO 2008073569 | 6/2008 |

OTHER PUBLICATIONS

Brinkmeier et al., "Towards a Denial-of-Service Resilient Design of Complex IPsec Overlays," 2009 IEEE International Conference on Communications, Jun. 14-18, 2009, IEEE, 2009.

Sadeghi et al., "The Silence of the LANs: Efficient Leakage Resilience for IPsec VPNs," European Symposium on Research in Computer Security, Sep. 2012, pp. 253-270, Springer Berlin Heidelberg, 2012.

Rossberg et al., "Secure Overlay-Based Auto-configuration of Complex IPsec VPNs," 2012, retrieved at https://www.tuilmenau.de/fileadmin/media/telematik/rossberg/rossberg10futureSec.pdf on Mar. 6, 2017.

* cited by examiner

VIRTUAL PRIVATE NETWORK RESILIENCY OVER MULTIPLE TRANSPORTS

BACKGROUND

A virtual private network ("VPN") is created by securing communications between end points by encrypting and encapsulating data transmissions therebetween. A VPN deployment normally employs a head-end that terminates VPN tunnels from various endpoints to provide a secure transport for data. Currently, resiliency or fail-over of a VPN tunnel is achieved either by providing multiple head-ends that may be geographically dispersed, by clustering multiple head-ends in a single location, or a combination thereof. These techniques are available to address the issues with head-ends in the same transport. If a client device has multiple transports, a separate tunnel needs to be setup for each transport to achieve resiliency, resulting in the need for a customized and complicated routing arrangement. Currently, there is no technique to use a single tunnel to leverage all head-ends in all transports to make the tunnel more resilient.

SUMMARY

Concepts and technologies disclosed herein are directed to VPN resiliency over multiple transports. According to one aspect of the concepts and technologies disclosed herein, a customer premises equipment can select, from a transport preference database, a transport from a plurality of transports available to support a VPN tunnel. The transport selected can be associated with a highest priority value of the plurality of transports in the transport preference database. The customer premises equipment can initiate setup of the VPN tunnel through the transport selected from the plurality of transports. The customer premises equipment can determine whether setup of the VPN tunnel was successful. If the customer premises equipment determines that setup of the VPN tunnel was successful, the customer premises equipment can end setup of the VPN tunnel.

In some embodiments, the customer premises equipment can zero a setup timer and a retry counter for the transport selected from the plurality of transports. If the customer premises equipment determines that setup of the VPN tunnel was not successful, the customer premises equipment can determine if a status of the transport selected from the plurality of transports is good. If the customer premises equipment determines that the status of the transport selected from the plurality of transports is good, the customer premises equipment can determine whether the setup timer is less than a predefined threshold time and whether the retry counter is less than a predefined threshold of tries. If the customer premises equipment determines that the setup timer is less than the predefined threshold time and that the retry counter is less than the predefined threshold of tries, the customer premises equipment can again initiate setup of the VPN tunnel through the transport selected from the plurality of transports.

In some embodiments, the customer premises equipment can zero a setup timer and a retry counter for the transport selected from the plurality of transports. If the customer premises equipment determines that setup of the VPN tunnel was not successful, the customer premises equipment can determine if a status of the transport selected from the plurality of transports is good. If the customer premises equipment determines that the status of the transport selected from the plurality of transports is good, the customer premises equipment can determine whether the setup timer is less than a predefined threshold time and whether the retry counter is less than a predefined threshold of tries. If the customer premises equipment determines that the setup timer is greater than or equal to the predefined threshold time and the retry counter is greater than or equal to the predefined threshold of tries, the customer premises equipment can determine whether at least a further transport from the plurality of transports is available to support the VPN tunnel. If the customer premises equipment determines that at least the further transport from the plurality of transports is available to support the VPN tunnel, the customer premises equipment can select, from the transport preference database, a new transport from the plurality of transports based upon a next highest priority value of the plurality of transports in the transport preference database, and can initiate setup of the VPN tunnel through the new transport. If the customer premises equipment determines at least the further transport from the plurality of transports is not available, the customer premises equipment can end setup of the VPN tunnel. If the customer premises equipment determines that the status of the transport selected from the plurality of transports is not good, the customer premises equipment can select, from the transport preference database, a new transport from the plurality of transports based upon a next highest priority value of the plurality of transport in the transport preference database, and can initiate setup of the VPN tunnel through the new transport.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein provide VPN tunnel resiliency over multiple transports. The concepts and technologies disclosed herein make setup of the tunnel transport-agnostic and intelligently maintains a VPN tunnel to be in operational status leveraging all configured head-ends. The transport can be or can include any IP network built upon any Layer 2 technology. The transport can be any private network or public network (e.g., the Internet), which provides connectivity in IPv4 and/or IPv6 address space.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for VPN resiliency over multiple transports will be described.

Figure 1:
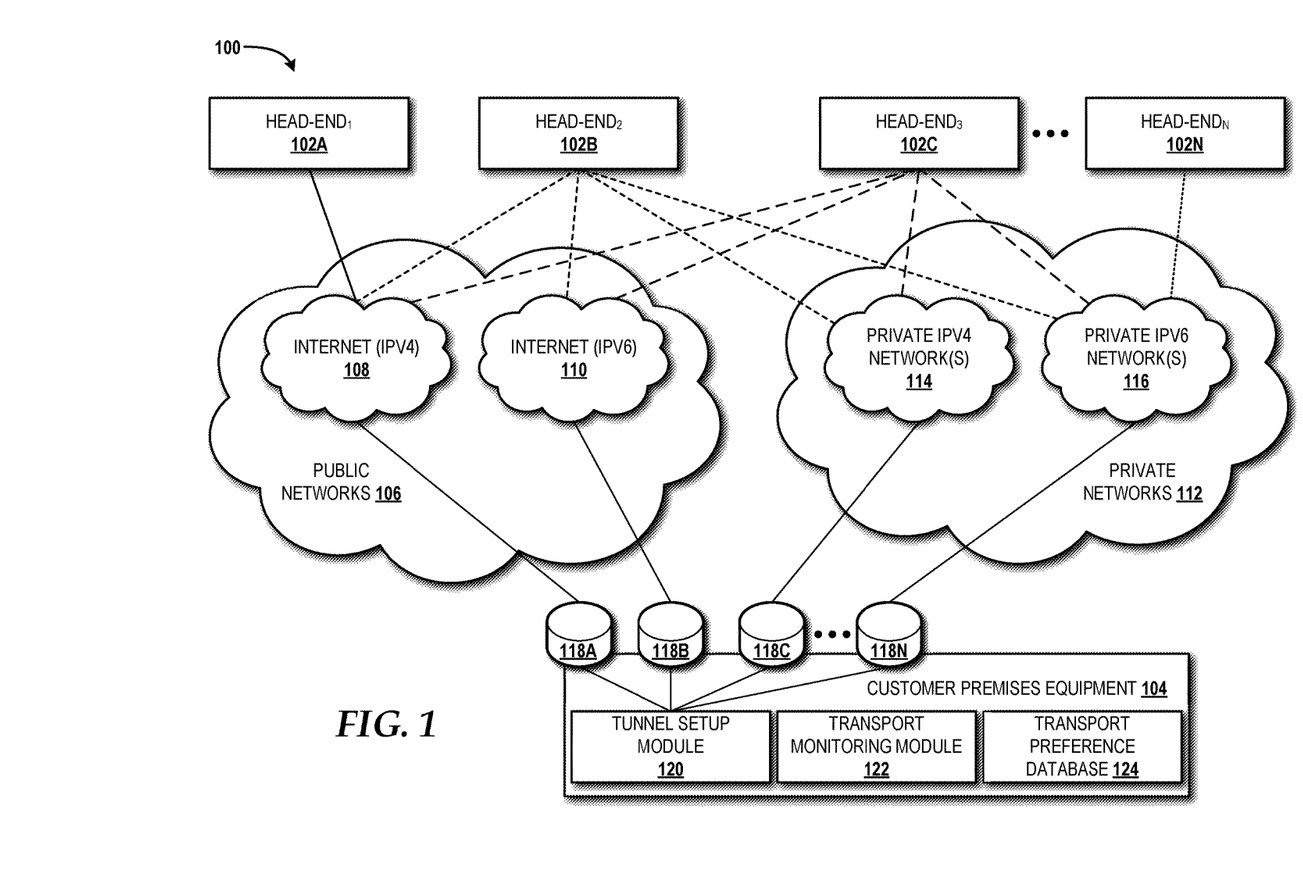
FIG. 1 is a block diagram illustrating a network environment in which aspects of the concepts and technologies can be implemented.

Turning now to FIG. 1, a block diagram illustrating aspects of a network environment 100 in which the concepts and technologies disclosed herein can be implemented will be described. The illustrated network environment 100 includes a plurality of head-ends 102A-102N (head-end$_1$ 102A, head-end$_2$ 102B, head-end$_3$ 103C . . . head-end$_N$ 102N; collectively, "head-ends 102"). Each of the head-ends 102 can terminate a VPN tunnel from one or more endpoints, such as a customer premises equipment ("CPE") 104. In accordance with the concepts and technologies disclosed herein, VPN resiliency is provided over multiple transport networks ("transports") that the CPE 104 supports. The transports can be or can include one or more public networks 106—such as the Internet with IPv4 addressing ("the Internet (IPv4)") 108 and/or the Internet with IPv6 addressing ("the Internet (IPv6)") 110—and/or one or more private networks 112—such as private IPv4 network(s) 114 and/or private IPv6 network(s) 116. The public network(s) 106 and/or the private network(s) 112 can be or can include one or more cloud computing networks. The CPE 104 can leverage one or more interfaces 118A-118N to set up a single VPN tunnel, thereby making the VPN tunnel transport-agnostic and resilient.

The CPE 104 can be or can include equipment designed to operate at a customer premises (not shown). The CPE 104, in some embodiments, can be or can include a router, switch, gateway, set-top box, computer, computing device, mobile device, or any other hardware equipment that is located at the customer premises and capable of implementing the concepts and technologies disclosed herein. More particularly, the illustrated CPE 104 can execute, via one or more processors (best shown in FIGS. 4 and 5), a VPN tunnel setup module 120 and a transport monitoring module 122, both of which will be described in detail herein. The illustrated CPE 104 also includes an on-board database referred to herein as a transport preference database 124, additional details of which are now described.

The transport preference database 124 contains information about all the interfaces 118A-118N. One element of this information can include a configurable priority value (shown in the following table as Priority) for each interface that states that particular interface's importance when a failover occurs. Example database fields and descriptions thereof are shown below in the following table.

| Field Name | Description |
|---|---|
| Index | Unique identifier of the transport |
| Network Type | Public vs Private, can be used as a condition of failover |
| WAN | Specify the interface name of the hardware |
| VLAN ID | Specify VLAN ID used by the transportation of encrypted packets |
| IP Protocol | Specify Layer 3 protocol to be used |
| Address | Address used by the OSI Layer 3 protocol |
| Head-ends | Head-end's addresses the client intends to reach via this connection |
| Priority | Transport preference, the lower the better, range from 0 to 1000 |
| Local Interface | The interface name in the IPsec client |
| Status | Dynamically maintain by TMD, specify the usability of the said connection, to speed up the failover transition |
| Tunnel Profile | Associated tunnel profile including all the IKE/IPsec information needed, can be left empty should the same profile is assumed |

The transport preference database 124, in some embodiments, can be created by an orchestration/provisioning tool. In other embodiments, the transport preference database 124 can be created manually. The data elements in the transport preference database 124 can be independent units. Alternatively, the data elements in the transport preference database 124 can correspond to an existing configuration element of the CPE 104.

The VPN tunnel setup module 120 and/or the transport monitoring module 122 can include computer-executable instructions. In some embodiments, the VPN tunnel setup module 120 and/or the transport monitoring module 122 can be implemented as software services, such as daemons, although other software implementations are contemplated.

The transport monitoring module 122 can monitor all transports associated with the CPE 104 (i.e., connected via one or more of the interfaces 118) to constantly verify the aliveness (e.g., Boolean) of the communication between the CPE 104 and the associated head-ends (one or more of the head-ends 102) on each specific transport. In this manner, transition of failover is quicker and mitigates problems. The tunnel setup module 120 can monitor the aliveness of the active tunnel. Should the active tunnel fail, the tunnel setup module 120 can iterate through the transport preference database 124 to find the next optimal transport based upon the priority of the transport, the transport type, the aliveness, the round trip time ("RTT"), the delay to the head-end(s) 102, or some combination thereof. After the next transport is selected, the tunnel setup module 120 can apply the related connection parameters to try to setup the tunnel. The tunnel setup module 120 can repeat this process until the tunnel is rebuilt successfully. If all of the interfaces 118 fail, the tunnel setup module 120 can keep trying from the first interface again in an indefinite loop. This enables restoration of the tunnel as soon as possible. In some embodiments, the tunnel setup module 120 allows for optional preemption. Preemption is used to decide whether the tunnel should be restored on the most preferred interface when the connection in the specific transport returns from a failed condition. When preemption is enabled, the transport monitoring module 122 can trigger the tunnel to be switched back to the primary transport from a less-preferred transport. Additional details regarding the tunnel setup module 120 are described herein below with reference to FIG. 2. Additional details regarding the transport monitoring module 122 are described herein below with reference to FIGS. 3A-3B.

In accordance with the concepts and technologies disclosed herein, a secure tunnel will always be "ON" providing resiliency, thereby alleviating the need for an external out of band ("OOB") device. This can represent a cost savings for network providers and also can benefit enterprises. The concepts and technologies disclosed herein can setup a VPN tunnel that leverages any possible transport over one or more of the public networks 106 and/or the private networks 112. This enables devices, such as the CPE 104, to have a secure path to the designated destination all the time. The CPE 104 is meant to failover one single VPN tunnel across all the interfaces 118 on the CPE 104, thus making client devices easier to deploy and work with common Universal Plug and Play ("uPnP") features. In current deployments, network providers setup more than one VPN tunnel simultaneously to get a seamless transition from one to the other on failure. However this needs more resources on the head-end 102, and it also needs customized routing arrangements for each implementation. The concepts and technologies disclosed herein can achieve similar capabilities with only a single tunnel, thereby conserving resources while being very efficient. The VPN client can be implemented in multiple configurations. For example, the VPN client can be implemented as a physical hardware client, such as the CPE 104, or virtually as a virtual network function ("VNF") hosted by a hypervisor. The VNF implementation can be on a cloud computing platform, such as described herein below with reference to FIG. 7.

Figure 2:
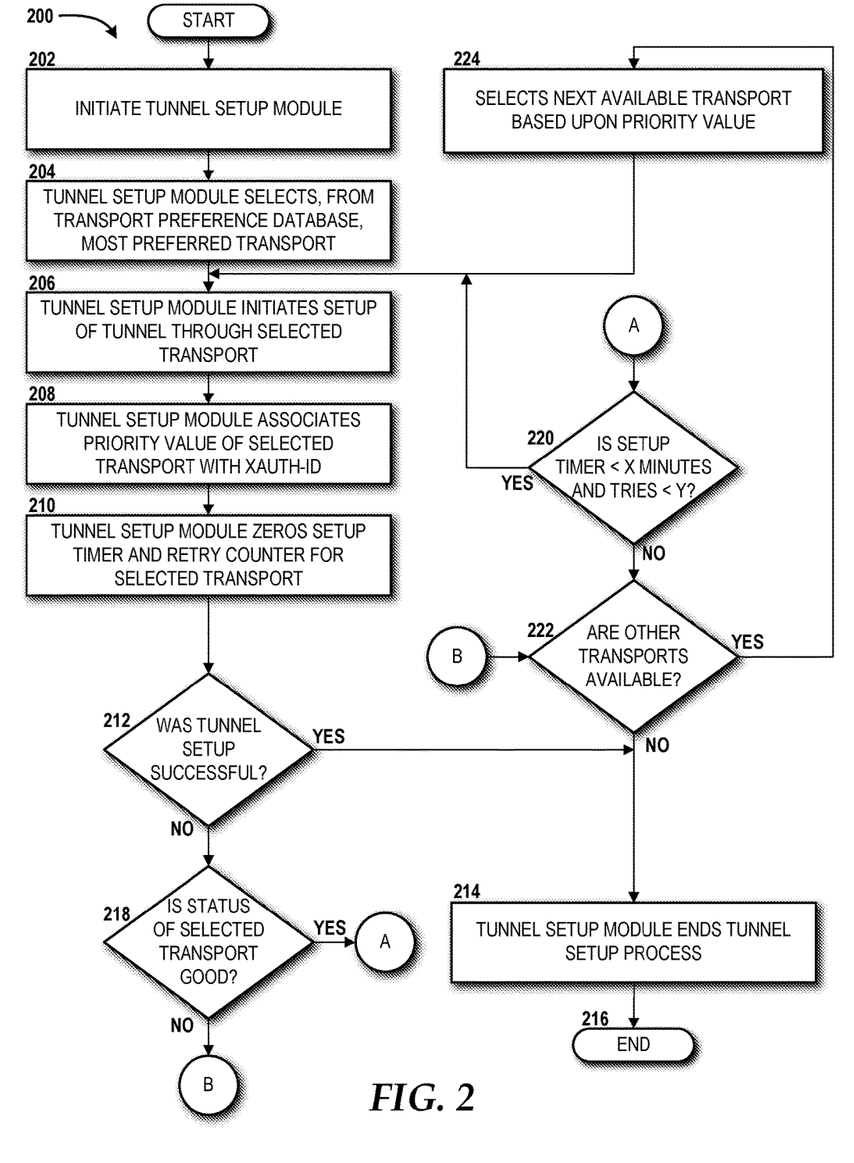
FIG. 2 is a flow diagram illustrating a method for VPN tunnel setup, according to an illustrative embodiment

Turning now to FIG. 2, aspects of a method 200 for VPN tunnel setup will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, modules (e.g., the tunnel setup module 120 and the transport monitoring module 122), programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the methods are described as being performed, at least in part, by one or more processors (best shown in FIGS. 4 and 5), via execution of one or more software modules, such as the tunnel setup module 120 and/or the transport monitoring module 122. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202, where the tunnel setup module 120 is initiated. From operation 202, the method 200 proceeds to operation 204, where the tunnel setup module 120 can select, from the transport preference database 124, a most preferred transport. The most preferred transport can be the transport of a plurality of transports in the transport preference database 124 that has a highest priority value.

From operation 204, the method 200 proceeds to operation 206, where the tunnel setup module 120 initiates a tunnel setup process for a tunnel through the selected transport (i.e., the most preferred transport selected at operation 204). From operation 206, the method 200 proceeds to operation 208, where the tunnel setup module 120 associates the priority value stored in the transport preference database 124 for the selected transport to an XAUTH-ID.

From operation 208, the method 200 proceeds to operation 210, where the tunnel setup module 120 zeros a setup timer and a retry counter for the selected transport. The setup timer can include a predefined threshold time (e.g., X minutes) that limits that amount of time that can be used to set up a tunnel. The retry counter can include a predefined threshold number of tries that limits the number of tries (e.g., Y minutes) to setup a tunnel.

From operation 210, the method 200 proceeds to operation 212, where the tunnel setup module 120 determines if tunnel setup was successful. If the tunnel setup module 120 determines that tunnel setup was successful, the method 200 proceeds to operation 214, where the tunnel setup module 120 ends the tunnel setup process. From operation 214, the method 200 proceeds to operation 216, where the method 200 ends. If, however, the tunnel setup module 120 determines that the tunnel setup was unsuccessful, the method 200 proceeds to operation 218, where the tunnel setup module 120 determines whether the status of the selected transport is good. The tunnel setup module 120 can determine whether the status of the selected transport is good based upon Internet Control Message Protocol ("ICMP") echo request/reply or User Datagram Protocol ("UDP")/Transfer Control Protocol ("TCP") probe. If the tunnel setup module 120 determines that the status of the selected transport is good, the method 200 proceeds to operation 220, where the tunnel setup module 120 determines if the setup timer is less than X minutes and the number of tries (retry counter) is less than Y. If so, the method returns to operation 206, and the method 200 continues as described above. If, however, the tunnel setup module 120 determines that the setup timer is greater than or equal to X minutes and the number of tries is greater than or equal to Y, the method 200 proceeds to operation 222. Returning to operation 218, if the tunnel setup module 120 determines that the status of the selected transport is not good, the method 200 proceeds directly to operation 222.

At operation 222, the tunnel setup module 120 determines whether any other transports are available. If not, the method 200 proceeds to operation 214, where the tunnel setup module 120 ends the tunnel setup process. From operation 214, the method 200 proceeds to operation 216, where the method 200 ends. If, however, the tunnel setup module 120 determines, at operation 222, that one or more other transports are available, the method 200 proceeds to operation 224, where the tunnel setup module 120 selects, from the transport preference database 124, a next available transport. The method 200 then proceeds to operation 206 for the next available transport.

Figure 3A:
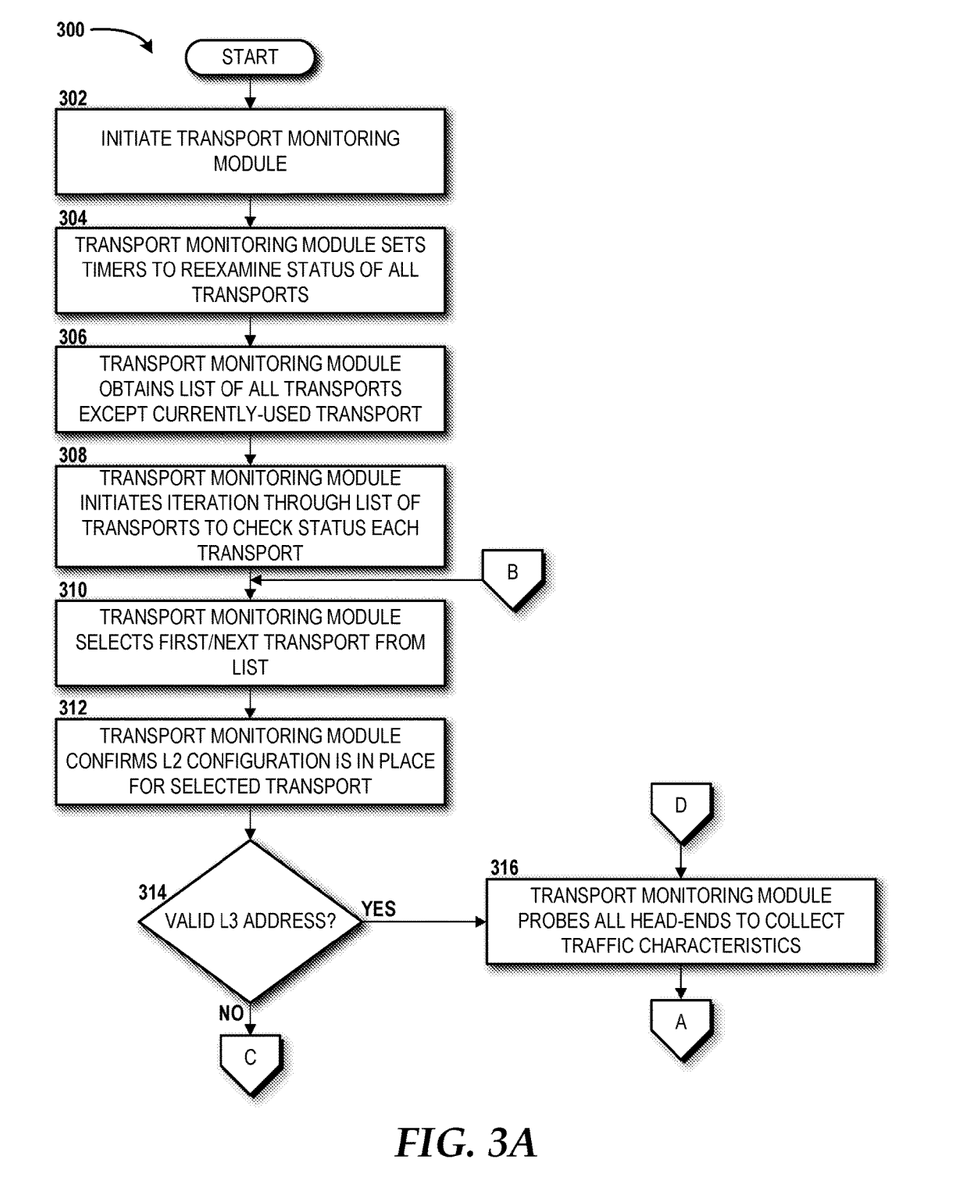
FIGS. 3A-3B are flow diagrams illustrating a method for monitoring transports, according to an illustrative embodiment.
Figure 3B:
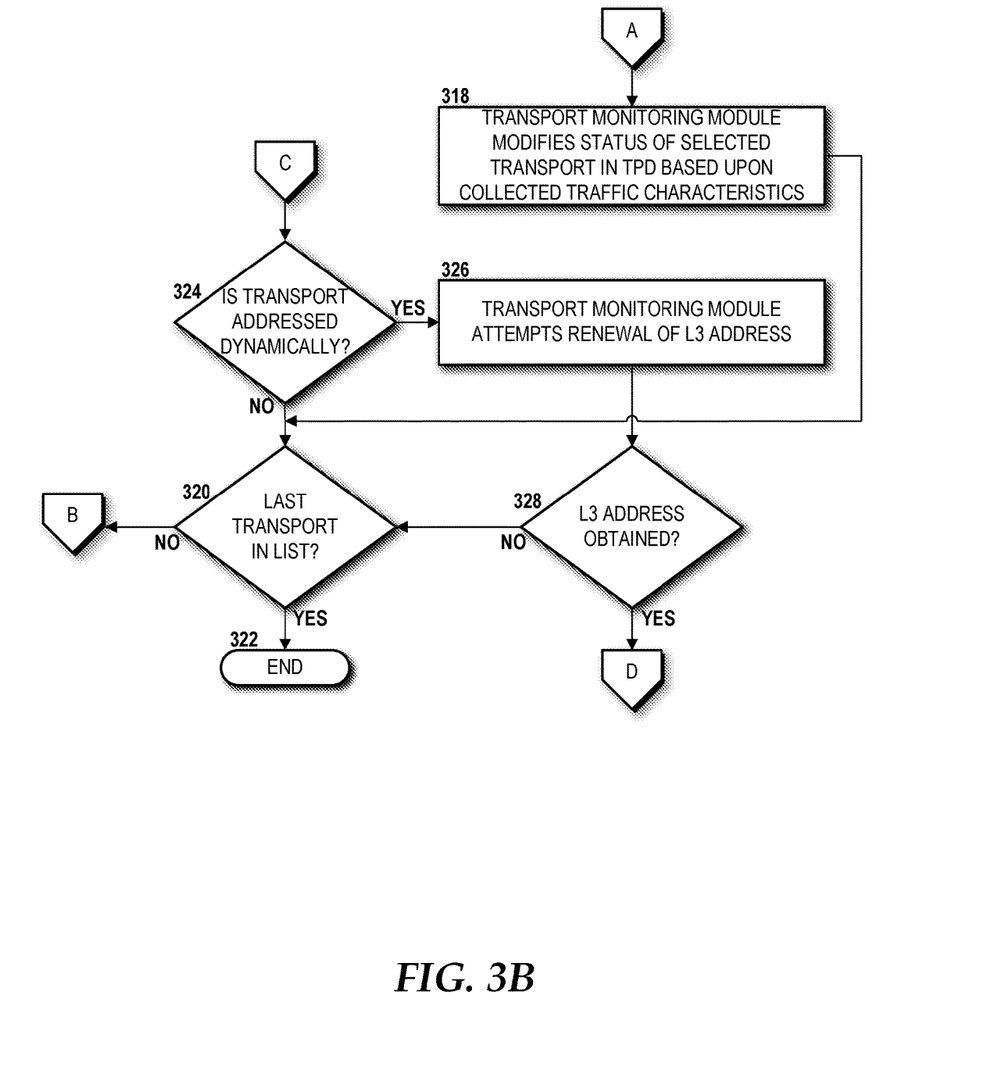

Turning now to FIGS. 3A and 3B, a method 300 for monitoring transports will be described, according to an illustrative embodiment. The method 300 begins at operation 302 (shown in FIG. 3A), where the transport monitoring module 122 is initiated. From operation 302, the method 300 proceeds to operation 304, where the transport monitoring module 122 sets timers to reexamine the status of all viable transports. From operation 304, the method 300 proceeds to operation 306, where the transport monitoring module 122 obtains a list of all transports except for the currently-used transport.

From operation 306, the method 300 proceeds to operation 308, where the transport monitoring module 122 initiates iteration through the list of transports to check the status of each transport. From operation 308, the method 300 proceeds to operation 310, where the transport monitoring module 122 selects a transport from the list. On the first iteration through the list, the transport monitoring module 122 selects the first transport from the list. On subsequent iterations, the transport monitoring module 122 selects the next transport from the list.

From operation 310, the method 300 proceeds to operation 312, where the transport monitoring module confirms the Layer 2 ("L2") configuration is in place for the selected transport. From operation 312, the method 300 proceeds to operation 314, where the transport monitoring module 122 determines if a valid Layer 3 ("L3") address (i.e., IPv4/IPv6 address) exists for the selected transport. If a valid L3 address exists for the selected transport, the method 300 proceeds to operation 316, where the transport monitoring module 122 probes all head-ends 102 to collect traffic characteristics.

From operation 316, the method 300 proceeds to operation 318, shown in FIG. 3B, where the transport monitoring module 122 modifies the status of the selected transport in the transport preference database 124 based upon the traffic characteristics collected at operation 316. From operation 318, the method 300 proceeds to operation 320, where the transport monitoring module 122 determines if the selected transport is the last transport in the list. If so, the method 300 proceeds to operation 322, where the method 300 ends. If not, the method 300 returns to operation 310, shown in FIG. 3A, where the transport monitoring module 122 selects the next transport in the list and the method 300 proceeds as described above.

Returning to operation 314, shown in FIG. 3A, if the transport monitoring module 122 determines that a valid L3 address does not exist for the selected transport, the method proceeds to operation 324 (shown in FIG. 3B), where the transport monitoring module 122 determines if the transport is addressed dynamically. If the transport monitoring module 122 determines that the transport is addressed dynamically, the method 300 proceeds to operation 326, where the transport monitoring module attempts renewal of the L3 address. From operation 326, the method 300 proceeds to operation 328, where the transport monitoring module 122 determines if an L3 address was obtained as result of the renewal attempt. If no L3 address was obtained, the method 300 returns to operation 320, and the method 300 proceeds as described above. If, however, the transport monitoring module 122 is able to obtain an L3 address, the method 300 returns to operation 316, shown in FIG. 3A, and the method 300 proceeds as described above.

Returning to operation 324, if the transport monitoring module 122 determines that the transport is not addressed dynamically, the method 300 proceeds to operation 320, and the method 300 proceeds as described above. If, at operation 320, the transport monitoring module 122 determines the selected transport is not the last transport in the list, the method 300 returns to operation 310, and the method 300 proceeds as described above.

Figure 4:
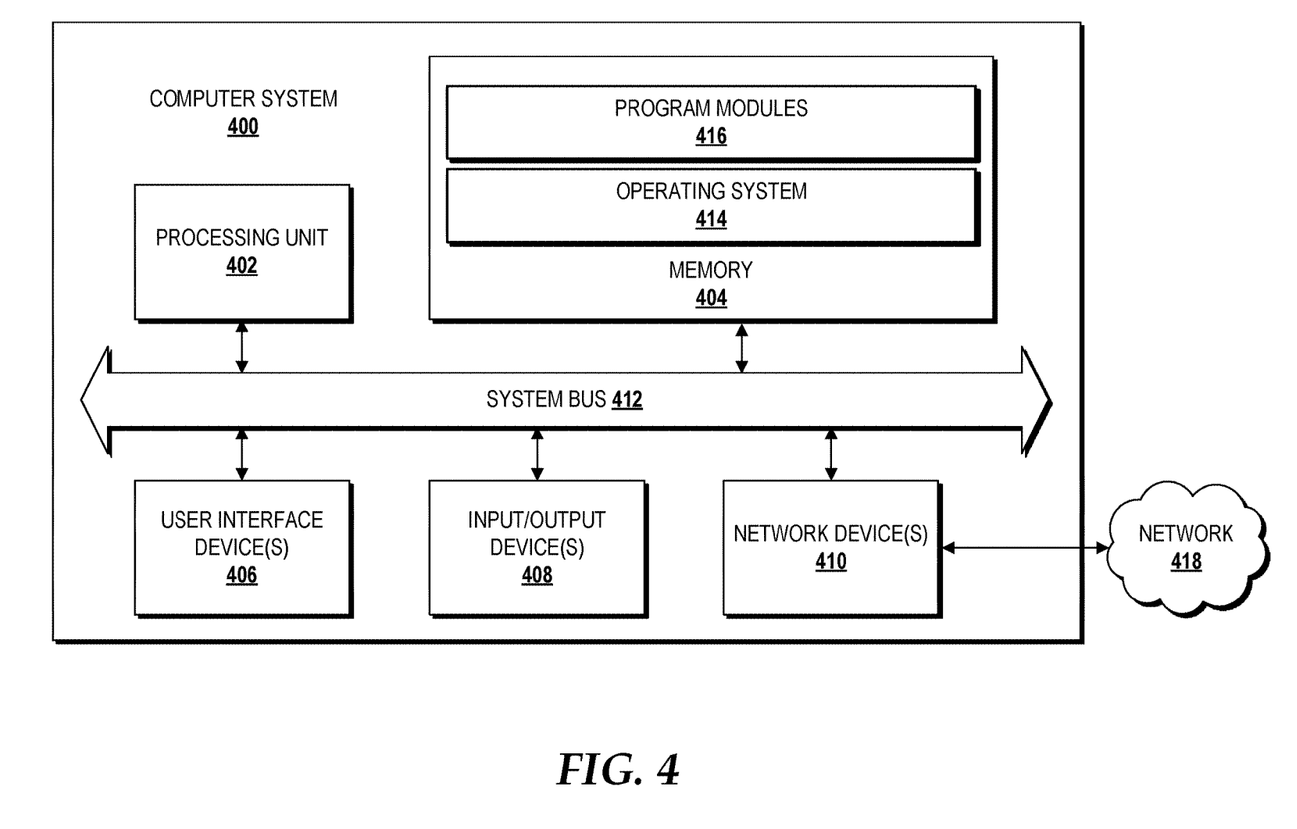
FIG. 4 is a block diagram illustrating an example computer system and components thereof capable of implementing aspects of the embodiments presented herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. For example, the head-ends 102 and/or the customer premises equipment 104 can utilize, at least in part, an architecture that is the same as or at least similar to the architecture of the computer system 400. It should be understood, however, that modification to the architecture may be made to facilitate certain interactions among elements described herein.

The computer system 400 includes a processing unit 402, a memory 404, one or more user interface devices 406, one or more I/O devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistant ("PDAs"), cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418. Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), or a wired Metropolitan Area Network ("MAN"). The network 418 can be or can include the Internet, or any other network or combination of networks described herein.

Figure 5:
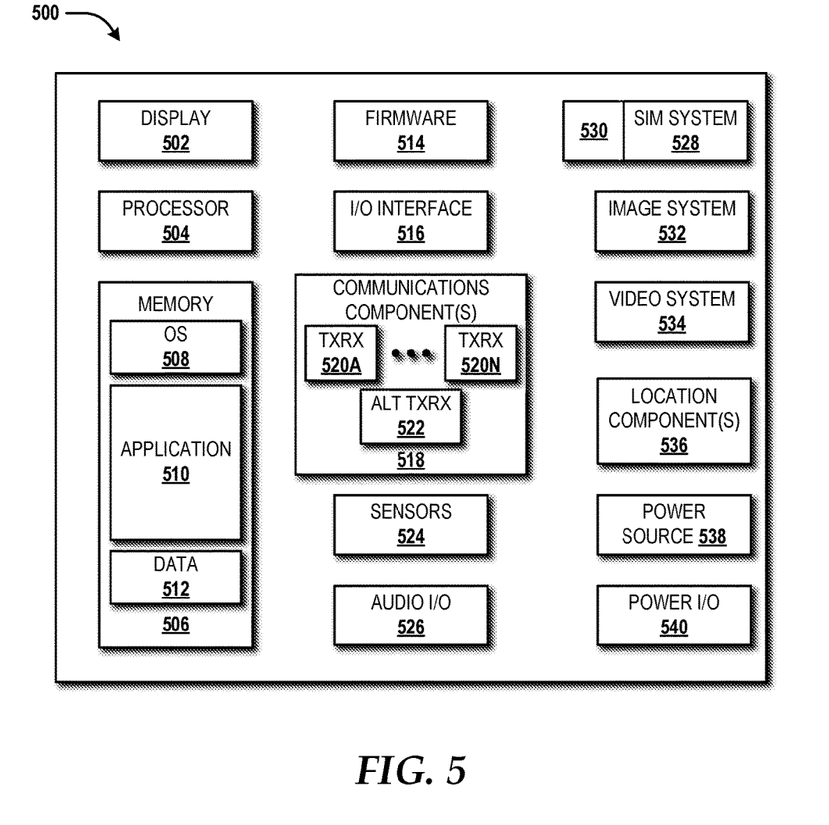
FIG. 5 is a block diagram illustrating an example mobile device and components thereof capable of implementing aspects of the embodiments presented herein.

Turning now to FIG. 5, an illustrative mobile device 500 and components thereof will be described. In some embodiments, the customer premises equipment 104 can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardware connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA ONE, CDMA2000, LTE, and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
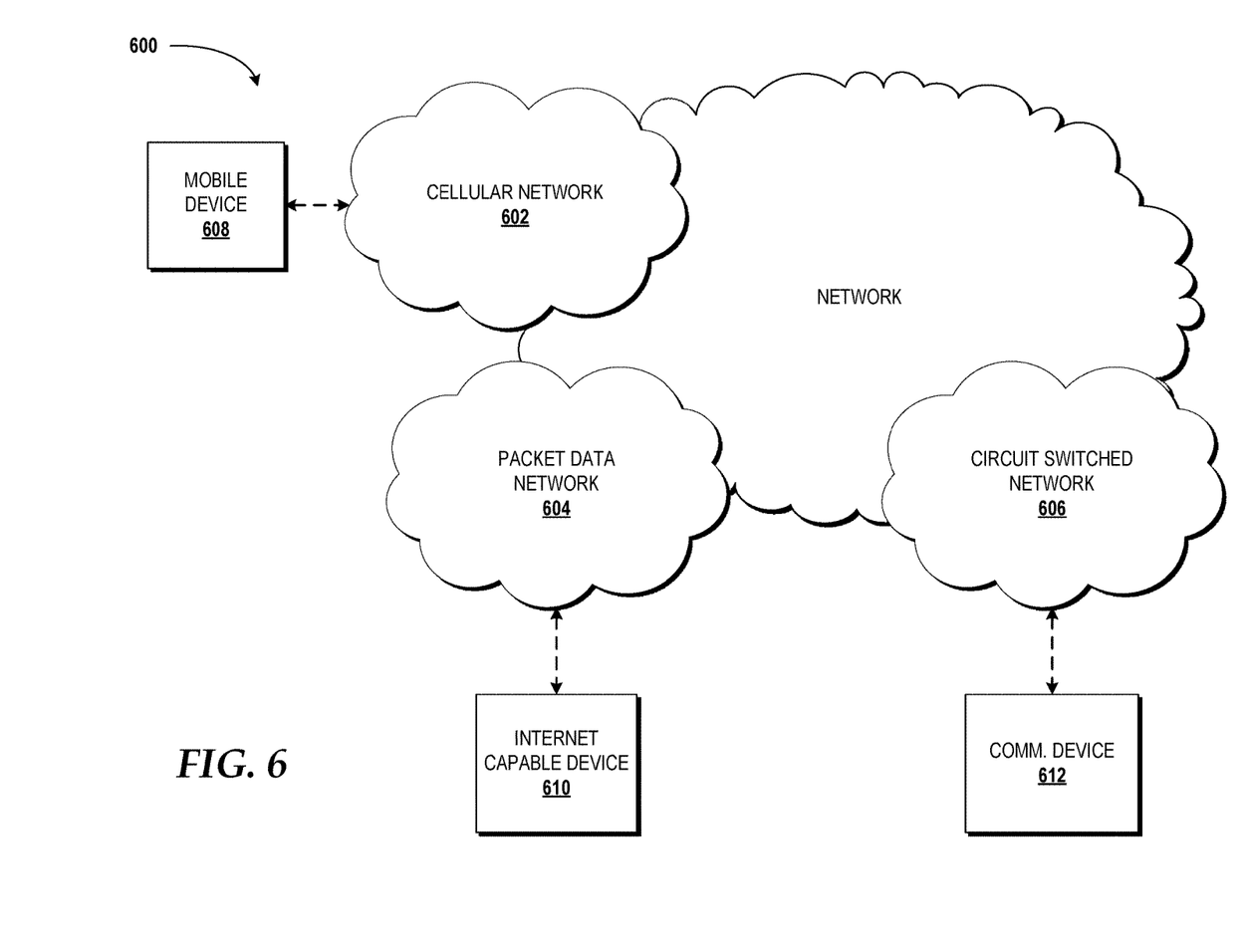
FIG. 6 is a block diagram illustrating an example network capable of implementing aspects of the embodiments presented herein.

Turning now to FIG. 6, details of a network 600 are illustrated, according to an illustrative embodiment. The network 600 includes a cellular network 602, a packet data network 604 (e.g., the public network(s) 106 and/or the private network(s) 112) and a circuit switched network 606, for example, a publicly switched telephone network ("PSTN").

The cellular network 602 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMES, SGWs, PGWs, short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the computing device 102, a cellular telephone, a user equipment, a mobile terminal, a PDA, a laptop computer, a handheld computer, and combinations thereof, can be operatively connected to the cellular network 602. The cellular network 602 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 602 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced Uplink ("EUL") (also referred to as High-Speed Uplink Packet Access ("HSUPA")), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Figure 7:
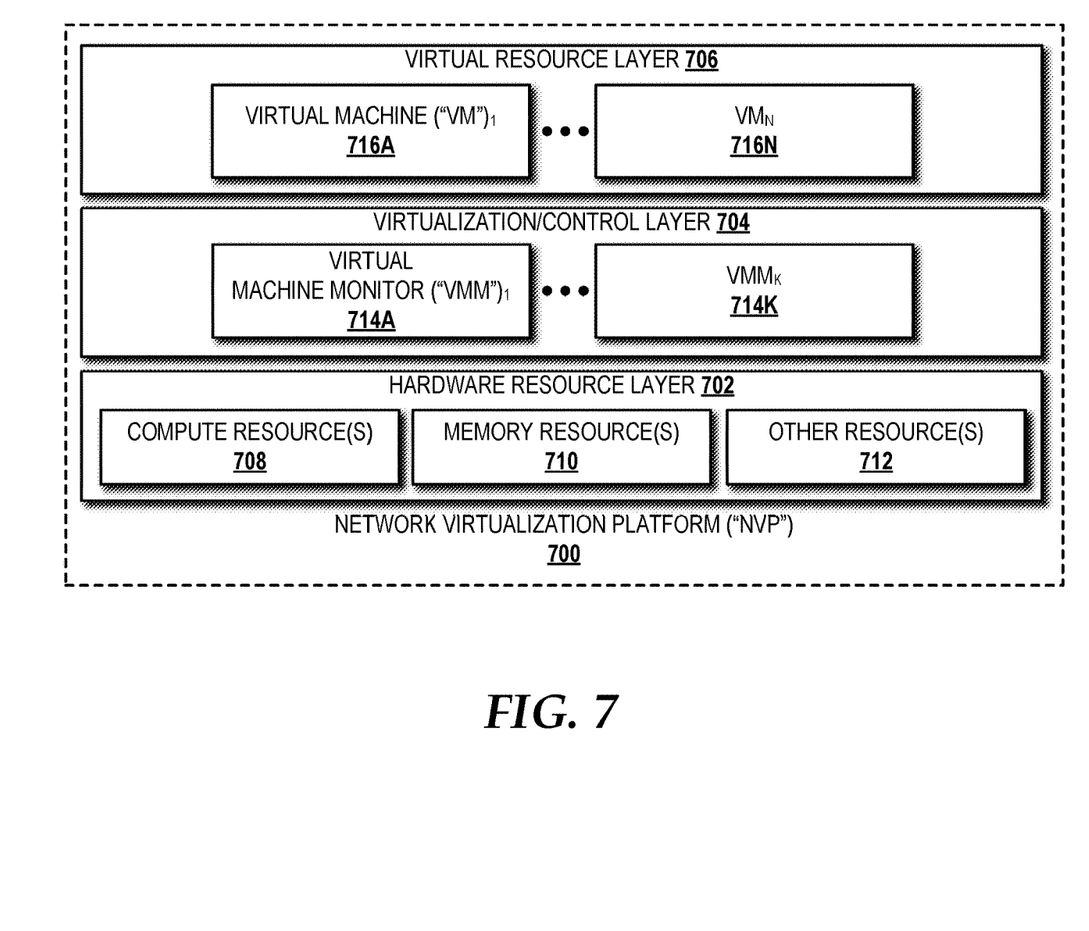
FIG. 7 is a block diagram illustrating an example network functions virtualization platform ("NFVP") and components thereof capable of implementing aspects of the embodiments presented herein.

Turning now to FIG. 7, a network virtualization platform ("NVP") 700 will be described, according to an exemplary embodiment. The architecture of the NVP 700 can be used to implement VNFs disclosed herein. For example, the NVP 700 can be utilized to implement the customer premises equipment 104.

The NVP 700 is a shared infrastructure that can support multiple services and network applications. The illustrated NVP 700 includes a hardware resource layer 702, a virtualization/control layer 704, and a virtual resource layer 706 that work together to perform operations as will be described in detail herein.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 702 can be virtualized by one or more virtual machine monitors ("VMMs") 714A-714K (also known as "hypervisors"; hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716"). Each of the VMs 716 can execute one or more applications.

Based on the foregoing, it should be appreciated that concepts and technologies directed to VPN resiliency over multiple transports have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A customer premises equipment comprising:
   a processor; and
   memory comprising computer-executable instructions that, when executed by the processor, cause the processor to perform operations comprising
   selecting, from a transport preference database, a transport from a plurality of transports available to support a VPN tunnel, wherein the transport selected is associated with a highest priority value of the plurality of transports in the transport preference database,
   initiating setup of the VPN tunnel through the transport selected from the plurality of transports,
   determining whether setup of the VPN tunnel was successful
   zeroing a setup timer and a retry counter for the transport selected from the plurality of transports,
   in response to determining that setup of the VPN tunnel was not successful, determining if a status of the transport selected from the plurality of transports is good,
   in response to determining that the status of the transport selected from the plurality of transports is good, determining whether the setup timer is less than a predefined threshold time and whether the retry counter is less than a predefined threshold of tries,
   in response to determining that the setup timer is less than the predefined threshold time and that the retry counter is less than the predefined threshold of tries, again initiating setup of the VPN tunnel through the transport selected from the plurality of transports, and
   in response to determining that the setup timer is greater than or equal to the predefined threshold time and the retry counter is greater than or equal to the predefined threshold of tries, determining whether at least a further transport from the plurality of transports is available to support the VPN tunnel.

2. The customer premises equipment of claim 1, wherein the operations further comprise in response to determining that setup of the VPN tunnel was successful, ending setup of the VPN tunnel.

3. The customer premises equipment of claim 1, wherein the operations further comprise, in response to determining that at least the further transport from the plurality of transports is available to support the VPN tunnel, selecting, from the transport preference database, a new transport from the plurality of transports based upon a next highest priority value of the plurality of transports in the transport preference database, and initiating setup of the VPN tunnel through the new transport.

4. The customer premises equipment of claim 1, wherein the operations further comprise, in response to determining at least the further transport from the plurality of transports is not available, ending setup of the VPN tunnel.

5. The customer premises equipment of claim 1, wherein the operations further comprise, in response to determining that the status of the transport selected from the plurality of transports is not good, selecting, from the transport preference database, a new transport from the plurality of transports based upon a next highest priority value of the plurality of transports in the transport preference database, and initiating setup of the VPN tunnel through the new transport.

6. A method comprising:
   selecting, by a customer premises equipment comprising a processor executing a tunnel setup module, from a transport preference database, a transport from a plurality of transports available to support a VPN tunnel, wherein the transport selected is associated with a highest priority value of the plurality of transports in the transport preference database;
   initiating, by the customer premises equipment, setup of the VPN tunnel through the transport selected from the plurality of transports;
   determining, by the customer premises equipment, whether setup of the VPN tunnel was successful;
   zeroing a setup timer and a retry counter for the transport selected from the plurality of transports;
   in response to determining that setup of the VPN tunnel was not successful, determining if a status of the transport selected from the plurality of transports is good;
   in response to determining that the status of the transport selected from the plurality of transports is good, determining whether the setup timer is less than a predefined threshold time and whether the retry counter is less than a predefined threshold of tries;
   in response to determining that the setup timer is less than the predefined threshold time and that the retry counter is less than the predefined threshold of tries, again initiating setup of the VPN tunnel through the transport selected from the plurality of transports; and in response to determining that the setup timer is greater than or equal to the predefined threshold time and the retry counter is greater than or equal to the predefined threshold of tries, determining whether at least a further transport from the plurality of transports is available to support the VPN tunnel.

7. The method of claim 6, further comprising, in response to determining that setup of the VPN tunnel was successful, ending setup of the VPN tunnel.

8. The method of claim 6, further comprising, in response to determining that at least the further transport from the plurality of transports is available to support the VPN tunnel, selecting, from the transport preference database, a new transport from the plurality of transports based upon a next highest priority value of the plurality of transports in the transport preference database, and initiating setup of the VPN tunnel through the new transport.

9. The method of claim 8, further comprising, in response to determining at least the further transport from the plurality of transports is not available, ending setup of the VPN tunnel.

10. The method of claim 6, further comprising, in response to determining that the status of the transport selected from the plurality of transports is not good, selecting, from the transport preference database, a new transport from the plurality of transports based upon a next highest priority value of the plurality of transports in the transport preference database, and initiating setup of the VPN tunnel through the new transport.

11. A computer-readable storage medium having computer-executable instructed stored thereon that, when executed by a processor of a customer premises equipment, causes the customer premises equipment to perform operations comprising:

selecting, from a transport preference database, a transport from a plurality of transports available to support a VPN tunnel, wherein the transport selected is associated with a highest priority value of the plurality of transports in the transport preference database;

initiating setup of the VPN tunnel through the transport selected from the plurality of transports;

determining whether setup of the VPN tunnel was successful;

zeroing a setup timer and a retry counter for the transport selected from the plurality of transports;

in response to determining that setup of the VPN tunnel was not successful, determining if a status of the transport selected from the plurality of transports is good;

in response to determining that the status of the transport selected from the plurality of transports is good, determining whether the setup timer is less than a predefined threshold time and whether the retry counter is less than a predefined threshold of tries;

in response to determining that the setup timer is less than the predefined threshold time and that the retry counter is less than the predefined threshold of tries, again initiating setup of the VPN tunnel through the transport selected from the plurality of transports; and in response to determining that the setup timer is greater than or equal to the predefined threshold time and the retry counter is greater than or equal to the predefined threshold of tries, determining whether at least a further transport from the plurality of transports is available to support the VPN tunnel.

12. The computer-readable storage medium of claim 11, wherein the operations further comprise, in response to determining that setup of the VPN tunnel was successful, ending setup of the VPN tunnel.

13. The computer-readable storage medium of claim 11, wherein the operations further comprise, in response to determining that at least the further transport from the plurality of transports is available to support the VPN tunnel, selecting, from the transport preference database, a new transport from the plurality of transports based upon a next highest priority value of the plurality of transports in the transport preference database, and initiating setup of the VPN tunnel through the new transport.

14. The computer-readable storage medium of claim 11, wherein the operations further comprise, in response to determining at least the further transport from the plurality of transports is not available, ending setup of the VPN tunnel.

15. The computer-readable storage medium of claim 11, wherein the operations further comprise, in response to determining that the status of the transport selected from the plurality of transports is not good, selecting, from the transport preference database, a new transport from the plurality of transports based upon a next highest priority value of the plurality of transports in the transport preference database, and initiating setup of the VPN tunnel through the new transport.

* * * * *